(No Model.) 2 Sheets—Sheet 1.
W. W. LEE.
ART OF MAKING HOLLOW HANDLES.
No. 365,829. Patented July 5, 1887.
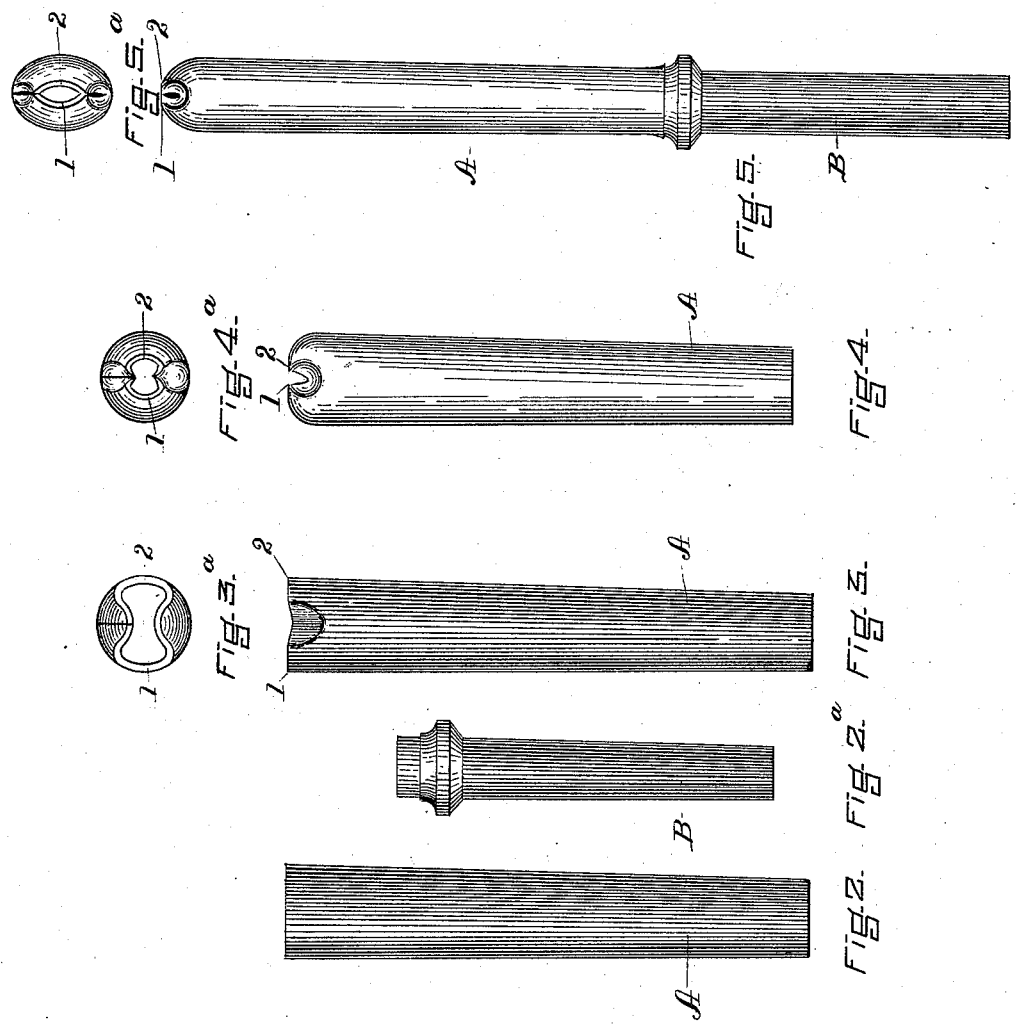
WITNESSES.
Edward S. Beach
John R. Snow.
INVENTOR.
Wm. W. Lee,
by his attorney,
J. E. Maynadier
N. PETERS, Photo-Lithographer, Washington, D. C.

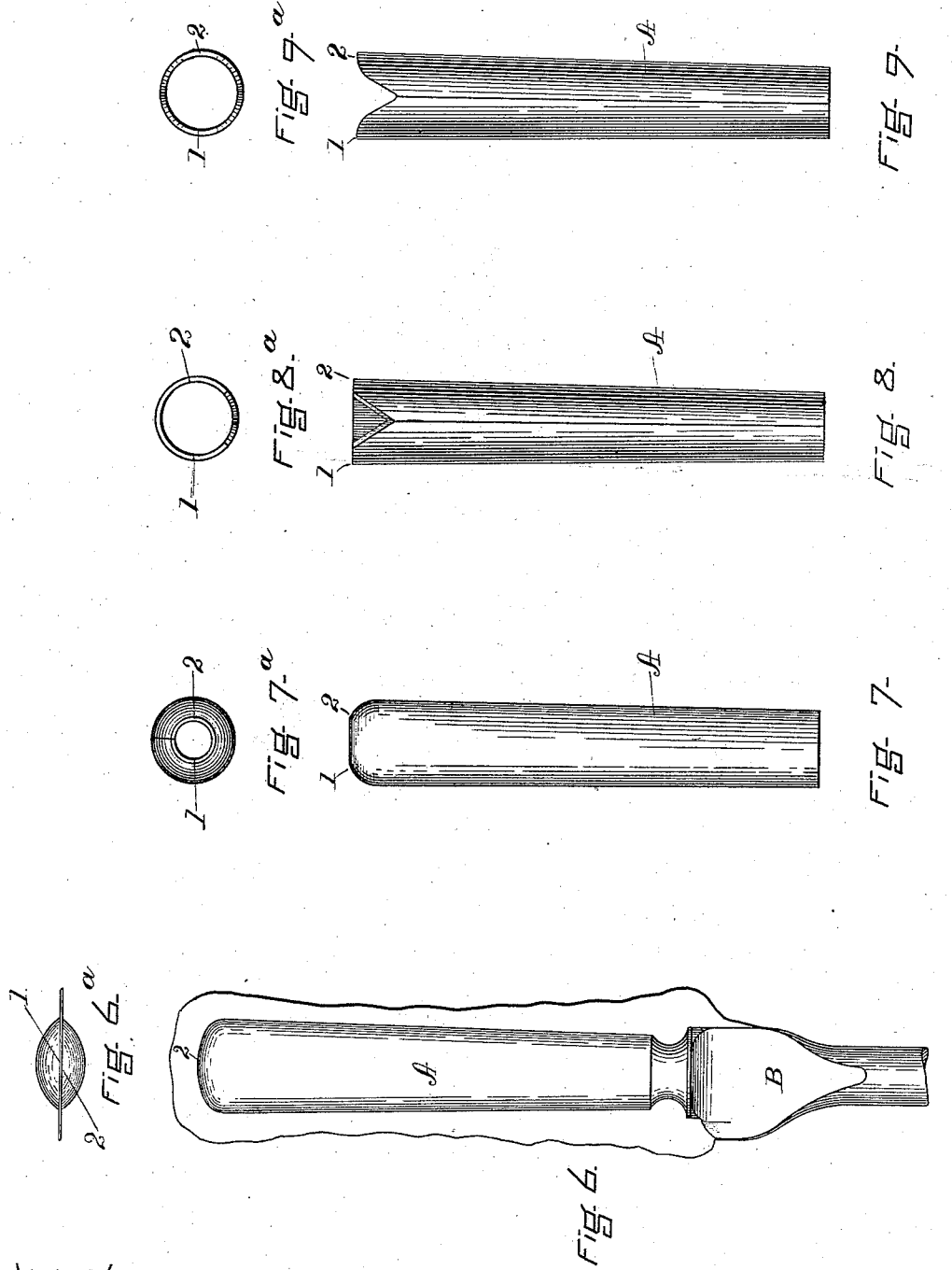

UNITED STATES PATENT OFFICE.

WILLIAM W. LEE, OF NORTHAMPTON, MASSACHUSETTS.

ART OF MAKING HOLLOW HANDLES.

SPECIFICATION forming part of Letters Patent No. 365,829, dated July 5, 1887.

Application filed April 1, 1887. Serial No. 233,249. (No model.)

*To all whom it may concern:*

Be it known that I, WILLIAM WILSON LEE, of Northampton, in the county of Hampshire and State of Massachusetts, have invented a new and useful Improvement in the Art of Making Hollow-Handle Implements, of which the following is a specification, reference being had to the accompanying drawings, which illustrate my improvement in the art as practiced in the manufacture of hollow-handle knives.

The object of my invention is to produce an implement—such as a knife, fork, chisel, screwdriver, or the like—whose handle is hollow; and my invention is an improvement in the art of making hollow-handled implements, as hereinafter described.

The tube A (shown in Figure 2) is made from a sheet-metal blank (shown in Fig. 1) of greater diameter at one end than at the other end in order to produce a tapering handle, and the blank B is formed by upsetting a piece of steel or otherwise, as will be clear to all skilled in the art without further description. This blank B is shown in Fig. 2ª.

In practicing my invention I approximately shape a tube, A, which is to form the finished handle, and secure the tube A and blade-forming blank B together by pressure between dies, so that they practically form one blank, and then raise this compound blank to a welding heat and weld it between dies, after which the fins or flashes are removed and the implement finished in the usual way.

One way of preparing tube A for the first operation is by first making indentations, as shown in Figs. 3 and 3ª, for these indentations are readily made, as will be plain to all skilled in the art, by striking the end of tube A with a forked die of the proper shape, and by reason of the indentations the end is partially closed more easily than if the indentations were not made. The indented end is then struck with a concave die of the proper shape, so as to close the end still more, as plainly shown in Figs. 4 and 4ª. I now insert in the other end of the tube A the blank B, which is adapted to be formed into an implement, and shape the tube A by pressure between forming-dies so shaped that the tube A is brought approximately to shape and also so connected to blank B that they can be handled as one piece. (See Figs. 5 and 5ª.) The compound blank A B thus formed is then raised to a welding heat, and the blank B is welded to the tube A, the butt-end of the tube closed and welded, the edges 1 2 of the tube also welded, and the desired shape given to the compound blank A B, (see Figs. 6 and 6ª,) preferably by drop-forging in the usual way.

It will be plain that blank B may be the shank of a partially-finished implement, as well as a blank from which the implement, except the handle, is formed. The drop-forged blank, Figs. 6 and 6ª, is thus made ready to be finished up into a hollow-handled implement, as will be plain to all skilled in the art. With some kinds and qualities of metals the butt-end of tube A may be partially closed by striking on end with a concave die without any indentations being first made. This is illustrated in Figs. 7 and 7ª; but the metal thus bent in is so hardened as to be liable to crack in the first operation unless annealed before subjection to that operation. Cutting away a part of the metal at one or both sides of the sheet-metal blank, as shown in Figs. 8, 8ª, 9, 9ª, answers as well as the indentations shown in Figs. 3 and 3ª, for the indentations and the notch or notches are obviously for the same purpose—namely, to make it easier to partially close the butt-end of tube A by striking it on end with the concave die. This partial closing of the butt-end of tube A, while not essential, is yet highly desirable, as it enables the first pair of dies to do their work far better than if the tube A were not thus prepared.

The tube A is made ready by the partial closing of its butt-end for the insertion of the blank B, and for the first pair of forming-dies which make the compound blank A B ready for the final welding operation, for by this first pair of dies the tube A is brought nearly to its ultimate shape, and the tube A and blank B are secured together, as above explained.

The essential features of my invention are the preparation of the tube A and blank B by the first pair of dies, so that the tube A will be approximately shaped and secured to blank B by that first operation, so as to form practically one blank, which can be heated and welded in the second pair of dies as readily as if it were one piece of metal.

The partial shaping of tube A and connecting it with blank B by this first operation not only makes the compound blank A B much easier to handle in practicing the final operation, but also makes a blank, A B, far better adapted for treatment by drop forging or welding between dies, for it makes a close and perfect weld at the butt and along the sides 1 2 of the tube A, and also of tube A to blank B. The first pair of dies are of a shape not only to compress the tube firmly about the shank of blank B, but also to partially close the butt-end of tube A, and to bring it somewhat near its finished shape, and the second pair of dies are of a shape to completely close and weld the butt-end of the tube, and weld the edges 1 and 2 together, and weld the tube and shank of blank B together, and shape the handle ready for the finishers.

In practice both pair of dies are arranged as drop-forging dies usually are; but the tube A and blank B are usually struck cold at the first operation.

Of course, the dies may be pressed together otherwise than as in drop-forging.

What I claim as my invention is—

The method of forming implements with hollow handles, above described, consisting in first securing the tube A and blank B together and partially shaping the tube A by pressing between dies, and then heating the compound blank A B thus formed and welding the tube A to blank B and also welding the butt-end and edges of tube A, and shaping the compound blank by pressure between a second pair of dies, all substantially as described.

WILLIAM W. LEE.

Witnesses:
C. H. PIERCE,
S. P. PECK.